Figure 5:
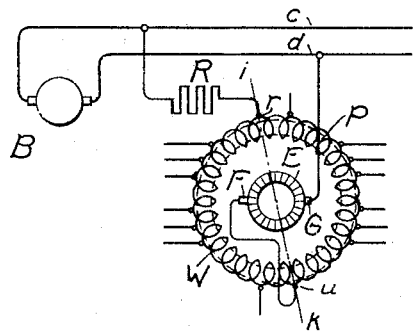

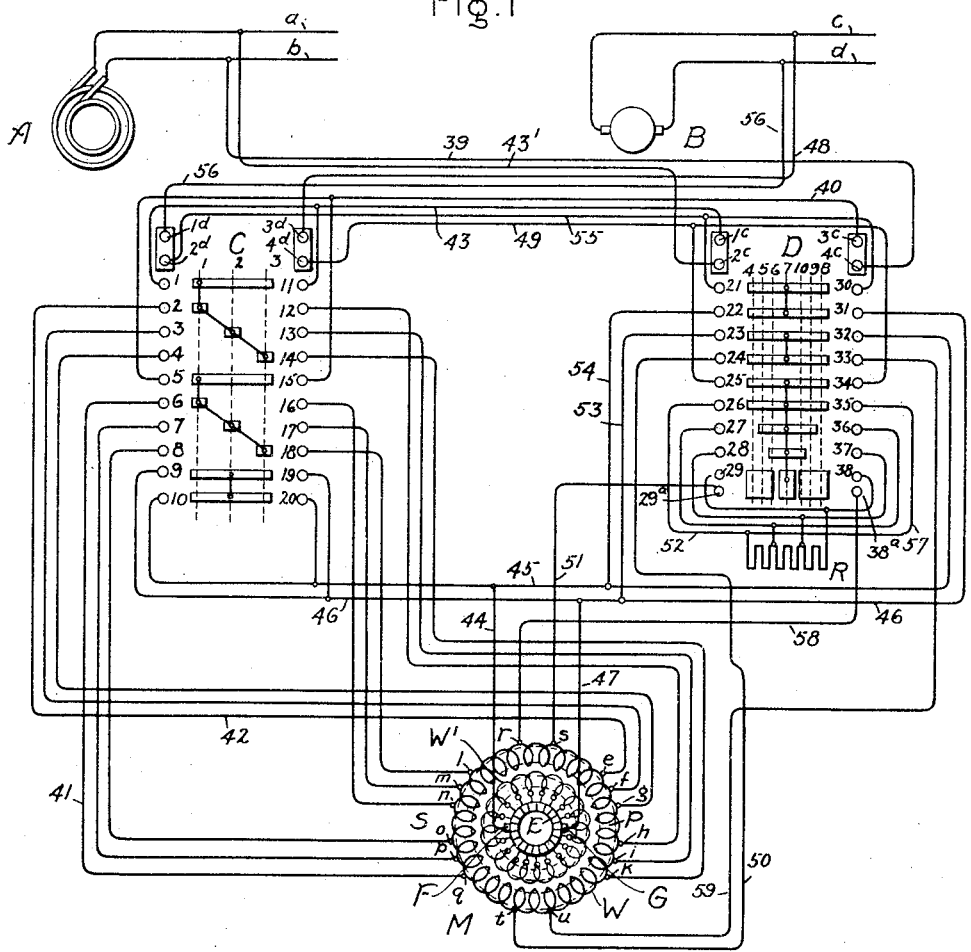

No. 787,227.  
PATENTED APR. 11, 1905.  
C. P. STEINMETZ.  
ELECTRIC MOTOR SYSTEM.  
APPLICATION FILED OCT. 5, 1903.

2 SHEETS—SHEET 2.

Witnesses.  
Harry N. Tilden.  
Helen Orford.

Inventor.  
Charles P. Steinmetz.  
by Albert G. Davis  
Att'y.

No. 787,227.

Patented April 11, 1905.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ELECTRIC-MOTOR SYSTEM.

SPECIFICATION forming part of Letters Patent No. 787,227, dated April 11, 1905.

Application filed October 5, 1903. Serial No. 175,721.

*To all whom it may concern:*

Be it known that I, CHARLES P. STEINMETZ, a citizen of the United States, residing at Schenectady, in the county of Schenectady and State of New York, have invented certain new and useful Improvements in Electric-Motor Systems, of which the following is a specification.

This invention relates to electric-motor systems. The advantages of alternating-current systems for long-distance transmission are well understood, and it is equally well-known that in cities continuous-current systems are the rule, because of the prohibition of high voltage, which constitutes one of the chief advantages of alternating systems, and also because the main load in city stations is usually motors operating street-railways, and continuous-current motors have been considered best adapted to such service. The power system having been installed with special reference to the railways, other devices requiring power and often the lighting system are operated from the same mains, and thus in nearly all cities the electric system is operated by continuous current, and in many respects such a system is desirable for urban use. The extension of railway-lines for considerable distances into the country, however, has rendered the use of alternating currents outside the city limits almost imperative. In many cases such a system has been employed, the usual practice being to equip the cars with continuous-current motors, which within the city limits are operated directly from the continuous-current mains, while without the limits they are supplied with current of the same character, which, however, is transformed from the alternating-current mains. Such a system is complicated and involves a large expense for transforming apparatus. A much cheaper and simpler system would be obtained if motors were employed which could be operated from either an alternating or continuous source of supply and suitable controlling apparatus were provided for making appropriate connections. The repulsion-motor is admirably adapted for such service, and it is one of the objects of my invention to so construct and arrange a motor of the repulsion type that it may be operated as a continuous-current motor.

My invention also contemplates the provision of controlling apparatus by means of which the circuit connections of the motor-windings may be changed from one condition of operation to the other. The usual form of repulsion-motor comprises a secondary member or armature having a commutator and winding such as is used in continuous-current machines, with short-circuited brushes bearing on said commutator, and a primary or field member which may be constructed with polar projections and wound in a manner similar to that observed in the construction of the fields of continuous-current machines. It is preferable, however, that the primary member should be wound with a distributed winding, such as is usual in induction-motors, as it renders the motor more susceptible of control and its operation is improved. The distributed winding may also be used to excite the poles of a continuous-current machine. It therefore appears that the repulsion-motor comprises all the parts that are necessary to the construction of a continuous-current motor. In order to change from one type of motor to the other, it is only necessary that the relations of certain of the parts be changed and connections made to the appropriate source of supply. When the machine is arranged and connected as a repulsion-motor, the brushes are displaced slightly from the polar line and are connected together, the primary winding being connected to the alternating-current source. The motor can be changed over to the continuous-current type by shifting the relative positions of the poles and brushes until the brushes are at the neutral point or have a small lead therefrom, breaking the connection between the brushes and connecting the armature and the primary or field in any of the operative relations that are well known in continuous-current practice. The change from the continuous-current to the repulsion type may be accomplished by an operation which is the converse of that described. The shifting of the poles and brushes with relation to each other can be brought about by shifting either or both of them.

While a primary or field member having a distributed winding gives best results, such a member as ordinarily constructed does not furnish commutation-places—that is, points at which the flux through the armature-coils is so reduced that the commutator-segments connected to the coils may pass into and out of contact with the brushes without serious sparking when the motor is operated from the direct-current source; and it is a further object of my invention to provide a primary member adapted to receive a distributed winding and also to furnish commutation-places. This may be conveniently done by removing one or more teeth from a primary member having the ordinary toothed construction, and thereby producing commutation slots or places which in width are equal to a plurality of winding-slots and one or more teeth. These slots are so located about the primary member that the armature-coils undergoing commutation will lie beneath them.

It is well known that for most satisfactory operation of continuous-current machines it is necessary that the brushes should be given a lead on one side of the neutral point when the motor is rotating in one direction and that the lead should be changed to the other side of the neutral point for the opposite direction of rotation. This has been accomplished by shifting the brushes or field member, or both; but motors employed in many capacities, notably railway-work, are subjected to jolts and jars, which render it advisable that the movable parts be as few as possible. When a distributed field-winding is used, the slight shift of field necessary to produce the desired lead may be accomplished without moving either the primary member or the brushes by simply changing the points of connection of the field-winding to the source of supply, and thereby shifting the points at which poles are developed in the primary member, or, in other words, the polar line is shifted, and it is a further object of my invention to provide suitable connections to accomplish this result and means by which such connections may be brought about.

I will now describe my invention in connection with the accompanying drawings, and what I consider new and of my invention will be pointed out in the appended claims.

Figure 6:
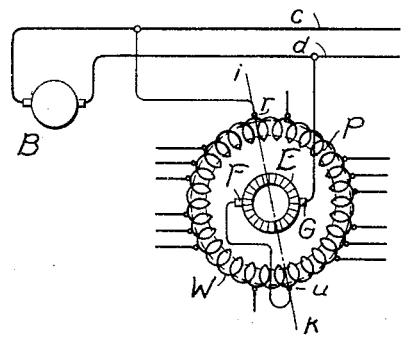
Figure 7:
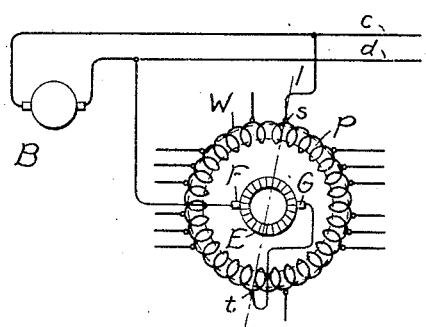
Figure 8:
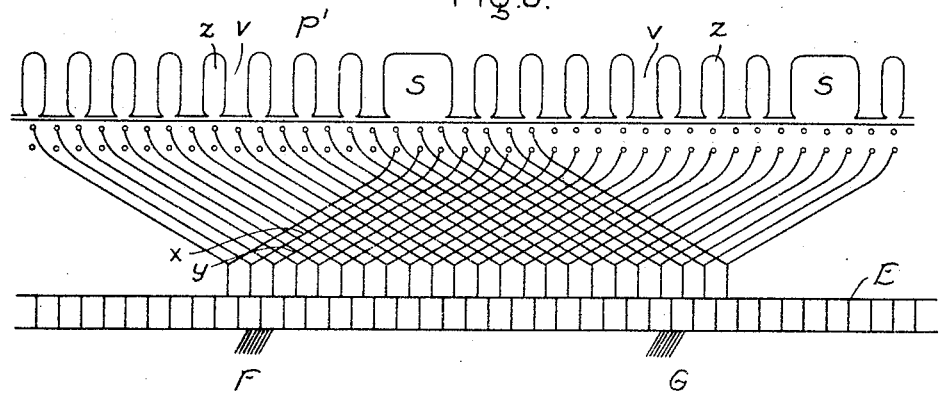

In the drawings, Figure 1 is a diagram illustrating the windings of a motor of the character described, controllers therefor, and suitable circuit connections. Figs. 2 to 7 are simplified diagrams showing connections of the motor-windings at different steps of control, and Fig. 8 is an end view of a development of a motor constructed with commutation-slots according to my invention.

Referring to Fig. 1, M is the motor; A, an alternating-current source of supply, from which extend the alternating set of mains comprising the conductors $a$ and $b$.

C is a controller by means of which suitable connections are made between the source A and the motor M.

B is a continuous-current source of supply, from which extend the continuous-current set of mains comprising the conductors $c$ and $d$.

D is a controller by means of which appropriate connections are made between the source B and the motor M, and R is a resistance corresponding to the ordinary starting resistance used in connection with continuous-current motors.

The controllers C and D are shown diagrammatically with their contacts developed upon a plane surface, the small circles indicating stationary contacts and the rectangles representing the movable contacts, as is customary in illustrating such apparatus. Upon each of the controllers are contacts through which the other controller is connected to line, the said contacts being so arranged that they are closed only in the "off" positions of the controllers, thereby rendering it impossible for both sources of supply to be connected to the motor at the same time, since as soon as one controller is moved into an operative position the circuit to the other is broken and remains so until the first controller is returned to its off position. These contacts are shown in Fig. 1 as stationary contacts $1^d$ to $4^d$ and $1^c$ to $4^c$ and the movable contacts engaging with them. Of course the usual mechanical interlocking devices may be employed as thought necessary or advisable. Upon the primary member P of the motor M is placed the winding W, and upon the secondary member S is placed the winding W'. These windings are shown in this case for convenience of illustration as of the Gramme type; but in practice the distributed drum type of winding, such as is common in the construction of induction-motors, would ordinarily be employed on the primary and a distributed continuous-current winding on the secondary. Any suitable windings might be made use of.

E is a commutator connected to the secondary winding W', and bearing upon said commutator are the brushes F and G. The winding W has one set of taps at points $e$, $f$, and $g$ slightly displaced from a commutation-place, and by "commutation-place" I mean a point of the winding which is opposite a secondary or armature coil which is undergoing commutation.

In all of the figures except Fig. 8 the commutator-leads are supposed to be straight, and therefore the commutation-places lie opposite the brushes. Another set of taps $h$, $i$, and $k$ are slightly displaced upon the other side of the commutation-place from the taps $e$, $f$, and $g$, and about other commutation-places in winding W other sets of taps are similarly located, as $l$, $m$, and $n$ and $o$, $p$, and $q$, which in this case are upon the opposite side of the winding, for since the motor shown is a two-pole machine the commutation-places are directly opposite each other. It will, however, be understood that a multipolar machine could be as well employed, in which case the number of brushes and commutation-places would be increased. The number of sets of taps would also be increased, one set being located on each side of a commutation-place. The winding W has other taps, which are slightly displaced from and upon both sides of points removed by approximately ninety degrees from the commutation-places, as the pair of taps $r$ and $s$ and the pair of taps $t$ and $u$. In the drawings the number of pairs of these taps is two, and they are located upon opposite sides of winding W, because, as before stated, a bipolar machine has been chosen to illustrate my invention. With an increase in the number of poles the number of pairs of taps would be increased with that of the commutation-places.

By the term "slightly displaced" I intend to indicate a displacement less than that which exists between the taps adjacent to the commutation-places and those approximately ninety degrees removed therefrom, the term being used to indicate the displacement of the former taps from the commutation-places and the latter taps from points ninety degrees removed from said commutation-places as distinguished from the displacement of the former set of taps from the latter. As a matter of fact, these taps, which are described as "slightly displaced," may be displaced through a considerable angle, and by "ninety degrees" I do not necessarily mean a geometrical angle of that size, but I intend to indicate ninety electrical degrees, or one-quarter of the distance through which an electrical conductor passes in completing an electrical cycle in any given machine. This method of indicating displacement is well understood in the art and requires no further explanation.

In the controller C movement of the movable contacts to the left, and therefore into engagement with the stationary contacts 1 to 10, inclusive, connects the windings of the motor M to the alternating-current source A and in such manner that the motor operates as a repulsion-motor in one direction, while movement of the movable contacts of the controller C into engagement with the stationary contacts 11 to 20, inclusive, connects the motor M to operate similarly, but for rotation in the opposite direction. The controller is shown as being in the off position.

Movement of the movable contacts of the controller D to the left and into engagement with the stationary contacts 21 to 29$^a$, inclusive, operates to connect the motor M to the source B as a continuous-current motor for a certain direction of rotation, while movement of the movable contacts to the right into engagement with stationary contacts 30 to 38$^a$, inclusive, operates to similarly connect motor M, but for the opposite direction of rotation.

The connections of the motor in the various positions of the controller will now be traced, it being first supposed that it is desired to connect the motor to operate as one of the repulsion type and to the alternating-current source A. It being assumed that the desired direction of rotation will thus be obtained, the movable contacts of the controller C are moved toward the left until the stationary contacts 1 to 10, inclusive, lie along dotted line 1 1. This is the first position of the controller, and connections may be traced as follows: from main $b$ through conductor 39, stationary contacts 4$^c$ and 3$^c$, conductor 40, stationary contact 5, stationary contact 6, and conductor 41 to tap $q$ of winding W, thence through both sides of the winding W in parallel to tap $e$, through conductor 42, stationary contact 2, stationary contact 1, conductor 43, stationary contacts 1$^c$ and 2$^c$, and conductor 43' to main $a$. The circuit is then completed through the two halves of the winding W in parallel lying between the taps $q$ and $e$, which are the alternating-current taps farthest removed from and upon opposite sides of the commutation-places. Circuit may also be traced from brush F through conductor 44, conductor 45, stationary contact 10 and cross-connected movable contacts, stationary contact 9, conductor 46, and conductor 47 to brush G, thus connecting the brushes bearing upon the commutator E by a short circuit. The motor is now connected to operate as a repulsion-motor and is in the starting position. The connections of the motor in this position of the controller are as shown in Fig. 2, the position of the polar line being as shown by dotted line $a$ $b$. Continued movement of the controller to the left and into successive positions indicated by the dotted lines 2 2 and 3 3 operates to shift the connections of the mains $a$ and $b$ with the winding W to the successive pairs of taps $p$ and $f$, and $o$ and $g$, respectively, each step of the controller bringing the points of connection nearer to the commutation-places, and therefore shifting the polar line nearer to said commutation-places. In the last position of the controller (represented by line 3 3) the mains $a$ and $b$ are connected to the winding W at the taps $o$ and $g$, which are located nearest to the commutation-places, the controller then being in the "running" position and the motor connected as shown in Fig. 3, the polar line then being located as indicated by dotted line $c$ $d$.

Figure 4:
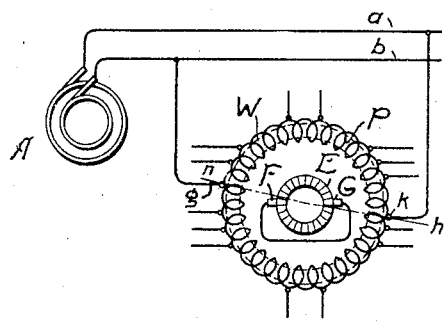

If now it be desired to operate the motor from the alternating-current mains, but with an opposite direction of rotation, the controller C being in the off position, as shown, the movable contacts are moved toward the right to engage the stationary contacts 11 to 20, inclusive, and in the first position these stationary contacts lie along the line 3 3. In this position of the controller a connection similar to that shown in Fig. 2 is made, and circuits may be similarly traced; but in this case the mains $a$ and $b$ will be connected across the alternating-current taps of winding W farthest from the commutation-places, but located on opposite sides thereof from those employed for the reverse rotation of the motor—that is, the mains will be connected to the winding W at connection-points $l$ and $k$. Movement of the controller into successive positions indicated by the dotted lines 2 2 and 1 1, respectively, operates in a manner similar to that outlined in connection with the reverse direction of rotation to move the points of connection of the mains with winding W nearer and nearer to the commutation-places, and in the running position the mains are connected to the points $n$ and $h$ of the winding. The connections in this last position are shown in Fig. 4 of the drawings, the polar line being represented by dotted line $g\ h$. This means for controlling a repulsion-motor by shifting the connections of the primary winding as described is not of my invention. It is fully described in an application of Maurice Milch, Serial No. 164,929, filed July 10, 1903.

If now it is desired to operate the motor from the continuous-current source of supply, the controller C is brought to the off position, and, depending upon the direction of rotation desired, the movable contacts of the controller D are moved either to the right or to the left. Assuming that movement to the right will produce the desired direction of rotation, the movable contacts are brought into engagement with the stationary contacts 30 to 38$^a$, inclusive, and in the first position of the controller these stationary contacts lie along the dotted line 8 8. The motor-circuits may then be traced as follows: from continuous-current main $c$, through conductor 48, stationary contacts 3$^d$ and 4$^d$, conductor 49, stationary contact 34, stationary contact 35, conductor 57, resistance R, stationary contacts 38 and 38$^a$, and conductor 58, to tap $r$ of winding W, thence through the different portions of the winding W in parallel to tap $u$, thence through conductor 59, stationary contact 33, stationary contact 32, conductor 45, conductor 44, brush F, the winding of the secondary member, brush G, conductor 47, conductor 46, stationary contact 31, stationary contact 30, conductor 55, stationary contacts 2$^d$ and 1$^d$, and conductor 56 to main $d$. The connections of the motor are now as shown in Fig. 5. It will be noted that the primary and secondary windings of the motor and the starting resistance R are connected in series across the continuous-current mains $c$ and $d$ and that connections are made to taps of the primary winding of motor M, which are slightly displaced from points ninety degrees removed from the commutation-places. The position of the polar line is indicated by dotted line $i\ k$. When thus connected, the motor will operate as a series continuous-current motor and may be employed as a braking-generator or be applied to any of the uses for which such a machine is suitable. The continuous-current taps of winding W being displaced from the alternating taps, the polar line as continuous-current motor will be correspondingly displaced from the polar line as repulsion-motor. If the taps for continuous-current operation were displaced by exactly ninety degrees from commutation-places, the brushes would lie exactly on the neutral point and the motor would operate in the same manner as the direct-current motors now commonly employed in railway service; but, as already explained, it is possible in a repulsion-motor having a distributed primary winding to so make the connections to the primary winding when the motor is to be operated as a continuous-current motor that the proper angle of lead for the brushes will be obtained for both directions of rotation. Movement of the controller into its succeeding positions designated by dotted lines 9 9, 10 10, and 7 7, respectively, operates to cut out the resistance R, and in the final position (indicated by the dotted line 7 7) such resistance is entirely removed from the circuit, thus leaving the secondary and primary windings in series across the continuous-current mains. The connections are then as shown in Fig. 6. This is the full "on" position of the controller for the given direction of rotation of the motor, and appropriate stops should be provided on the controller to prevent it being moved farther in this direction.

If it be desired to operate the motor in the opposite direction and from the continuous-current mains, the controller being in the off position, as shown, the movable contacts are moved toward the left until the stationary contacts 21 to 29$^a$, inclusive, lie along the dotted line 4 4. This is the first position of the controller for this direction of rotation, and circuits may be traced as follows: from continuous-current main $c$, through conductor 48, stationary contacts 3$^d$ and 4$^d$, conductor 49, stationary contact 25, stationary contact 26, conductor 52, resistance R, stationary contacts 29 and 29$^a$, and conductor 51, to tap $s$, thence through the portions of winding W in parallel to tap $t$, thence through conductor 50, stationary contact 24, stationary contact 23, conductor 53, conductor 46, conductor 47, brush G, commutator E and the secondary winding connected thereto, brush F, conductor 44, conductor 45, conductor 54, stationary contact 22, stationary contact 21, conductor 55, stationary contacts $2^d$ and $1^d$, and conductor 56, to continuous-current main $d$. In this position the relative connections of the brushes and the winding W have been reversed. The taps of the winding W to which the continuous-current conductors are now connected are now $t$ and $s$, which are oppositely displaced from taps $r$ and $u$ with relation to the points ninety degrees removed from the commutation-places, and therefore the lead of the brushes is reversed. The polar line is now as indicated by the dotted line $l\,m$. The connections are as shown in Fig. 7, except that the resistance R is included in series with the primary and secondary windings across the continuous-current mains. Movement of the controller into the successive positions indicated by the dotted lines 5 5, 6 6, and 7 7 operates to cut out the resistance R, and in the position indicated by the dotted line 7 7 the resistance is entirely cut out, the connections being as shown in Fig. 7.

It is advantageous, as before stated, that the coils of the armature should undergo commutation in a weak field, and I will now describe my invention for bringing this result about, reference being had to Fig. 8. Motors of the type shown and described are usually provided with a primary member P′, having winding-slots, as $z$, between teeth, as $v$, said slots being adapted to receive a distributed winding. This winding is not shown, as its manner of application is well understood and it forms no part of my invention. At certain places in said primary member certain of said teeth $v$ are removed, thereby producing commutation-slots S, each of which is equal in width to the sum of a plurality of winding-slots and one or more of the teeth. Such commutation-slots are so located upon the primary member P′ with relation to the brushes F and G that the coils under the brushes—as, for instance, the coils of which $x$ and $y$ are the end conductors and which lie under the brush F—lie under commutation-slots S. By this means the reluctances of the magnetic circuits at the points of commutation are increased and a weak field thereby produced at those points.

In accordance with the patent statutes I have described the principle of operation of my invention, together with the apparatus which I now consider to represent the best embodiment thereof; but I desire to have it understood that the apparatus shown in the drawings is only illustrative and that the invention may be carried out by other means than the specific embodiment which I have shown.

What I claim as new, and desire to secure by Letters Patent of the United States, is—

1. The combination of an alternating-current source of supply, a continuous-current source of supply, a motor, means for connecting said motor to the alternating-current source so that it will operate as a repulsion-motor, and means for connecting the said motor to the continuous-current source so that it will operate as a continuous-current motor.

2. A motor comprising a member provided with a distributed winding and a member provided with a winding connected to the segments of a commutator with brushes bearing thereon, in combination with means for connecting the motor-windings to an alternating-current source of supply in such a manner that the motor will operate as a repulsion-motor, and means for connecting the same motor-windings to a continuous-current source of supply in such a manner that it will operate as a continuous-current motor.

3. The combination with a motor having one of its members provided with a distributed winding and its other member with a winding connected to the segments of a commutator with brushes bearing thereon, of controlling switch-contacts connected to the motor-windings, certain of said contacts being arranged to connect the motor-windings to an alternating-current source in such a manner that the motor will operate as a repulsion-motor and other contacts being arranged to connect the said motor-windings to a continuous-current source in such a manner that it will operate as a continuous-current motor.

4. The combination with a motor having one of its members provided with a winding connected to the segments of a commutator with brushes bearing thereon and the other member with a distributed winding, of means for electrically connecting the commutator-brushes and for connecting the distributed winding on the other member of the motor to a single-phase source of supply so that it will generate a primary field along a line displaced by a small angle from the line of the short-circuiting brushes, and means for closing a circuit from a continuous-current source through the winding on the member provided with a commutator by way of the brushes bearing thereon and through the distributed winding on the other member of the motor by way of points lying along a line displaced in the neighborhood of ninety degrees from the line of the commutator-brushes.

5. The combination with a repulsion-motor comprising a primary member provided with a distributed winding and a secondary member having its winding connected to the segments of a commutator with short-circuiting brushes disposed thereon, of means for opening the short circuit between the commutator-brushes and connecting the commutator-brushes in circuit with the primary winding in such a manner that the motor may be operated as a series motor.

6. The combination with a repulsion-motor comprising a primary member provided with a distributed winding and a secondary member having its winding connected to the segments of a commutator with short-circuiting brushes disposed thereon, and means for opening the short circuit between the commutator-brushes and connecting the said brushes in circuit with the primary winding in such a manner that the primary member will be magnetized along a line displaced in the neighborhood of ninety degrees from the line of the commutator-brushes.

7. A repulsion-motor comprising a primary member provided with a distributed winding and a secondary member having its winding connected to the segments of a commutator on which are disposed short-circuiting brushes, and taps in the distributed winding disposed along a line which will give the proper angle of lead to the brushes when the motor is connected for operation as a series motor.

8. A repulsion-motor comprising a primary member provided with a distributed winding and a secondary member having its winding connected to the segments of a commutator on which are disposed short-circuiting brushes, and taps in the distributed winding disposed along lines which will give the proper angle of lead for either direction of rotation when the motor is connected for operation as a series motor.

9. A repulsion-motor comprising a primary member provided with a distributed winding and a secondary member having its winding connected to the segments of a commutator on which are disposed short-circuiting brushes, commutation-slots in the primary member, and means for connecting the motor-windings for operation as a continuous-current motor.

10. A motor system comprising a motor provided with a commutator and brushes bearing on said commutator, and means for connecting the brushes with a source of direct-current supply or for short-circuiting the brushes and connecting the motor to a source of alternating-current supply, whereby the motor may be caused to operate either as a direct or as an alternating current motor.

In witness whereof I have hereunto set my hand this 2d day of October, 1903.

CHARLES P. STEINMETZ.

Witnesses:
EDWARD WILLIAMS, Jr.,
MARCUS L. BYNG.